United States Patent
Hu et al.

(10) Patent No.: US 12,018,854 B2
(45) Date of Patent: Jun. 25, 2024

(54) VENTILATION DEVICE, AND CONSTANT AIR VOLUME CONTROL METHOD THEREFOR

(71) Applicant: FOSHAN WELLING WASHER MOTOR MANUFACTURING CO., LTD., Foshan (CN)

(72) Inventors: Xiaolin Hu, Foshan (CN); Wenjing Ke, Foshan (CN)

(73) Assignee: FOSHAN WELLING WASHER MOTOR MANUFACTURING CO., LTD., Foshan (CN)

( * ) Notice: Subject to any disclaimer, the term of this patent is extended or adjusted under 35 U.S.C. 154(b) by 108 days.

(21) Appl. No.: 17/099,005

(22) Filed: Nov. 16, 2020

(65) Prior Publication Data

US 2021/0372654 A1  Dec. 2, 2021

(30) Foreign Application Priority Data

May 29, 2020 (CN) .......................... 202010477540.4

(51) Int. Cl.
  *F24F 11/30* (2018.01)
  *F24F 11/74* (2018.01)
  *F24F 11/77* (2018.01)

(52) U.S. Cl.
  CPC .............. *F24F 11/74* (2018.01); *F24F 11/30* (2018.01); *F24F 11/77* (2018.01)

(58) Field of Classification Search
  CPC ............. F24F 11/74; F24F 11/77; F24F 11/30
  USPC ....................................................... 454/256
  See application file for complete search history.

(56) References Cited

U.S. PATENT DOCUMENTS

| 5,269,660 A * | 12/1993 | Pradelle ................... F24F 11/77 417/18 |
| 5,447,414 A * | 9/1995 | Nordby ..................... F24F 11/74 417/42 |
| 8,398,365 B2 * | 3/2013 | Hopkins ................ F04D 25/166 415/61 |

(Continued)

FOREIGN PATENT DOCUMENTS

| CN | 104698894 A | 6/2015 | |
| CN | 105135608 A * | 12/2015 | ............ F24F 11/047 |

(Continued)

OTHER PUBLICATIONS

Machine translation of ES-2545253-T3, patent/publication year of 2015.*

(Continued)

*Primary Examiner* — Michael G Hoang
*Assistant Examiner* — Ryan L Faulkner
(74) *Attorney, Agent, or Firm* — Anova Law Group, PLLC (57) ABSTRACT

A constant air volume control method includes acquiring a target air volume for a ventilation device, detecting a present rotational speed and a present torque of a motor of the ventilation device, selecting an air volume calculation formula corresponding to the target air volume according to a preset correspondence relation between air volumes and air volume calculation formulas, calculating a present air volume corresponding to the present rotational speed and the present torque, and adjusting motor parameters of the ventilation device according to a difference between the present air volume and the target air volume.

19 Claims, 2 Drawing Sheets

(56) References Cited

U.S. PATENT DOCUMENTS

| | | | |
|---|---|---|---|
| 9,347,453 B2* | 5/2016 | Hu | F24F 11/77 |
| 9,732,971 B2* | 8/2017 | Sugimoto | F24F 11/77 |
| 9,803,881 B2* | 10/2017 | Hu | F24F 11/77 |
| 10,138,901 B2* | 11/2018 | Benson | F24F 11/77 |
| 2014/0133999 A1* | 5/2014 | Hu | F04D 27/004 |
| | | | 417/44.1 |
| 2014/0323030 A1* | 10/2014 | Rugge | F24F 11/74 |
| | | | 454/256 |
| 2016/0054025 A1* | 2/2016 | Hu | F04D 27/004 |
| | | | 700/276 |
| 2017/0350404 A1* | 12/2017 | Sasaki | F24F 11/30 |
| 2018/0004171 A1* | 1/2018 | Patel | F24F 11/77 |
| 2018/0252422 A1* | 9/2018 | Salsbury | F24F 11/30 |

FOREIGN PATENT DOCUMENTS

| | | |
|---|---|---|
| CN | 109028222 A | 12/2018 |
| DE | 4324911 A1 | 1/1995 |
| ES | 2545253 T3 * | 9/2015 ........... F04D 27/004 |
| JP | S5935743 A | 2/1984 |
| WO | WO-2015106385 A1 * | 7/2015 ............ F24F 11/047 |

OTHER PUBLICATIONS

The China National Intellectual Property Administration (CNIPA) The First Office Action for Chinese Application 202010477540.4 Jul. 11, 2022 14 Pages (With Translation).

The China National Intellectual Property Administration (CNIPA) Search Report for 202010477540.4 Jul. 4, 2022 4 Pages (With Translation).

The China National Intellectual Property Administration (CNIPA) The Second Office Action for Chinese Application 202010477540.4 Oct. 31, 2022 17 Pages (With Translation).

* cited by examiner

VENTILATION DEVICE, AND CONSTANT AIR VOLUME CONTROL METHOD THEREFOR

CROSS-REFERENCE TO RELATED APPLICATION

This application claims priority to Chinese Patent Application No. 202010477540.4, filed on May 29, 2020, the entire content of which is incorporated herein by reference.

TECHNICAL FIELD

The present application relates to the technical field of motor control and, more particularly to a constant air volume control method and system for a ventilation device.

BACKGROUND

During ventilation operation of a ventilation device, such as an air conditioner, dust accumulation or filter blocking may happen in the ventilation duct along with the use time, which leads to variation in the internal static pressure of the ventilation duct. In addition, the difference in the shape of the ventilation duct installed may also lead to different internal static pressure of the ventilation duct. If the motor adopts the constant rotational speed control or the constant torque control, it may be unable to ensure a constant air volume in the ventilation duct.

In order to achieve the constant air volume control, an air volume sensor or a static pressure sensor can be installed for data collection, and the air volume can be controlled according to the collected data, thereby achieving the constant air volume control. However, such method will increase the hardware cost, and if malfunction or failure of the sensor happens, the accuracy of the detected air volume may decrease, leading to the risk of control abnormity.

SUMMARY

Embodiments of the present application provides a ventilation device, and a constant air volume control method and system thereof, which aim at solving the technical problems in the existing technology that the utilization of the sensor to measure the air volume increases the cost, and if sensor malfunction happens, the accuracy of the detected air volume will be affected and the control abnormity easily occurs.

In a first aspect, embodiments of the present application provide a constant air volume control method for a ventilation device. The method comprises:
  acquiring a target air volume;
  detecting a present rotational speed and a present torque of a motor of the ventilation device;
  selecting an air volume calculation formula corresponding to the target air volume according to a preset correspondence relation between air volumes and air volume calculation formulas, and calculating a present air volume corresponding to the present rotational speed and the present torque; and
  adjusting motor parameters of the ventilation device according to a difference between the present air volume and the target air volume.

In a possible implementation of the first aspect, the step of selecting an air volume calculation formula corresponding to the target air volume according to a preset correspondence relation between air volumes and air volume calculation formulas, and calculating a present air volume corresponding to the present rotational speed and the present torque comprises:
  calculating the present air volume corresponding to the present rotational speed and the present torque according to the air volume calculation formula $$Q_c = \sum_{k=0}^{j} \left( \sum_{m=0}^{i} \left( C_{km} \times n^{\left(\frac{k}{p}\right)} \times T^{\left(\frac{m}{q}\right)} \right) \right),$$

where $Q_c$ represents a calculated present air volume, n represents the rotational speed of the motor, T represents the torque of the motor of the ventilation device, m=0, 1, 2 ..., i, k=0, 1, 2 ..., j, both i and j are positive integers, p and q are certain positive integers, at least one of k/p or m/q is a decimal, $C_{km}$ represents a constant corresponding to different target air volumes.

In combination with a first aspect or in the first possible implementation of the first aspect, the correspondence relation between air volumes and air volume calculation formulas is a correspondence relation between air volume intervals and air volume calculation formulas.

In combination with the second possible implementation of the first aspect, in a third possible implementation of the first aspect, the air volume intervals are obtained by division according to one or more preset critical values.

In combination with the first aspect, in a fourth possible implementation of the first aspect, the air volume calculation formula comprises:

$$Q_c = C_0 + C_1 \times n + C_2 \times n \times T + C_3 \times T^{1/2} + C_4 \times T^2$$

where $Q_c$ represents a calculated present air volume, n represents a rotational speed of the motor, T represents a torque of the motor, $C_0$, $C_1$, $C_2$, $C_3$, and $C_4$ represent constants corresponding to the target air volume.

In combination with a first possible implementation of the first aspect or a forth possible implementation of the first aspect, in a fifth possible implementation of the first aspect, the constants are obtained by curve fitting of original data of the correspondence relation among the air volume, the rotational speed of the motor, and the torque of the motor acquired in advance.

In combination with the first aspect, in a sixth possible implementation of the first aspect, the step of adjusting motor parameters of the ventilation device according to a difference between the present air volume and the target air volume comprises:
  calculating a first target rotational speed of the motor according to the target air volume, the present air volume, and the present rotational speed; and
  calculating a corresponding first air volume according to the first target rotational speed, and calculating a second target rotational speed according to the first air volume, the target air volume, and the first target rotational speed, until a calculated N-th air volume corresponding to an N-th target rotational speed is consistent with the target air volume.

In combination with the sixth possible embodiment of the present aspect, in a seventh possible embodiment of the first aspect, the step of calculating a first target rotational speed of the motor according to the target air volume, the present air volume, and the present rotational speed:

calculating the first target air volume according to formula $$n_{ref} = \frac{Q_{ref}}{Q_c} n,$$

where $Q_{ref}$ represents the target air volume, $Q_c$ represents the present air volume, n represents the present rotational speed, $n_{ref}$ represents the first target rotational speed.

In combination with the first aspect, in an eighth possible implementation of the first aspect, the step of adjusting motor parameters of the ventilation device according to a difference between the present air volume and the target air volume comprises:

comparing the target air volume and the present air volume to yield a difference therebetween; and performing proportional control or proportional integral control according to the difference, to obtain the target torque corresponding to the target air volume.

In a second aspect, embodiments of the present application provide a constant air volume control system for a ventilation device. The system comprises:

a target air volume acquisition unit, configured for acquiring a target air volume;

a motor parameter detection unit, configured for detecting a present rotational speed and a present torque of a motor of the ventilation device;

a present air volume calculation unit, configured for selecting an air volume calculation formula corresponding to the target air volume according to a preset correspondence relation between air volumes and air volume calculation formulas, and calculating a present air volume corresponding to the present rotational speed and the present torque; and a motor parameter adjustment unit, configured for adjusting motor parameters of the ventilation device according to a difference between the present air volume and the target air volume.

In a third aspect, embodiments of the present application provide a ventilation device, comprising: a memory, a processor, and a computer program stored in the memory and operable on the processor. The processor is configured to implement the constant air volume control method for a ventilation device according to any of the possible implementations of the first aspect, when executing the computer program.

In a fourth aspect, embodiments of the present application provides a computer readable storage medium, the computer readable storage medium being stored with a computer program, which is configured to implement the constant air volume control method for a ventilation device according to any of the possible implementations of the first aspect when being executed by a processor.

Embodiments of the present application has the following advantages when compared with the existing technology, by selecting the air volume calculation formula corresponding to the target air volume, the present air volume corresponding to the acquired present rotational speed and present torque can be calculated. And according to the difference between the present air volume and the target air volume, the motor parameters of the ventilation device are adjusted so as to make the air volume of the ventilation device consistent with the target air volume. Because it is not necessary to use a sensor for directly measuring the air volume during the control process, the cost of the device may be reduced. Moreover, the acquired present air volume will not be affected by the accuracy of the sensor, the air volume calculation formula corresponding to the target air volume is conducive to improve the calculation accuracy of the target air volume, such that the motor parameters can be more accurately adjusted, thereby making the constant air volume control of the ventilation device more reliable and stable.

BRIEF DESCRIPTION OF THE DRAWINGS

In order to more clearly illustrate the technical solutions in the embodiments of the present application, the drawings that need to be used in the description of the embodiments will be briefly described hereinbelow. Obviously, the accompanying drawings in the following description are only some embodiments of the present application. For those skilled in the art, other drawings can be obtained based on these drawings without creative work.

DETAILED DESCRIPTION OF THE EMBODIMENTS

In the following description, for the purpose of illustration rather than limitation, specific details such as a specific system structure and technology are proposed for a thorough understanding of the embodiments of the present application. However, it should be clear to those skilled in the art that the present application can also be implemented in other embodiments without these specific details. In other cases, detailed descriptions of well-known systems, devices, circuits, and methods are omitted to avoid unnecessary details from obstructing the description of the present application.

It should be understood that when used in the specification and appended claims of the present application, the term "comprising" indicates the existence of the described features, wholes, steps, operations, elements, and/or components, but does not exclude existence or addition of one or more other features, wholes, steps, operations, elements, components, and/or collections thereof.

It should also be understood that the term "and/or" used in the specification and appended claims of the present application refers to any combination of one or more of the items listed in the associated and all possible combinations, and includes these combinations.

As used in the description of the present application and the appended claims, the term "if" can be interpreted as "when" or "once" or "in response to determining" or "in response to detecting." Similarly, the phrase "if it is determined that" or "if it is detected that [described condition or event]" can be interpreted as meaning "once it is determined that" or "response to determination" or "once it is detected that [described condition or event]" or "in response to detection of [condition or event described]" depending on the context.

In addition, in the description of the specification of the present application and the appended claims, the terms "first," "second," "third," etc. are only used to distinguish the description, and should not be understood as indicating or implying relative importance.

References described in the specification of the present application to "one embodiment" or "some embodiments" etc. mean that one or more embodiments of the present application include a specific feature, structure, or characteristic described in combination with the embodiment. Therefore, the phrases "in an embodiment," "in some embodiments," "in some other embodiments," "in still some other embodiments," etc. appearing in different places in this specification do not necessarily refer to the same embodiment, but mean "one or more but not all embodiments," unless otherwise specifically emphasized. The terms "comprising," "including," "having," and their variations all mean "including but not limited to" unless otherwise specifically emphasized.

In control of a constant air volume for a ventilation device, a correspondence relation between target air volumes within the whole air volume interval and motor operation parameters may be fitted by using a function relation. However, in condition where the air volume interval of the ventilation device is relatively large, the present air volume calculated by the function relation would have poor accuracy, which is calculated by an accuracy function relation, thus being unable to satisfy the high accuracy requirement of the air volume control.

Figure 1:
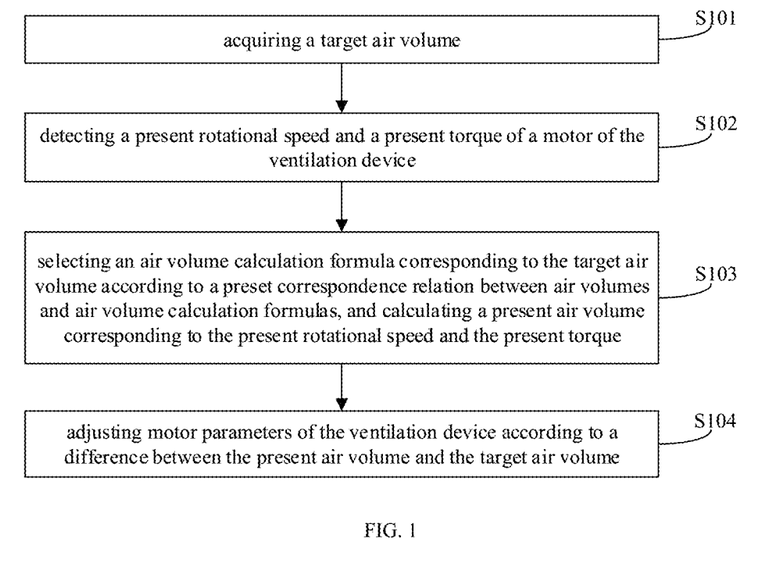
FIG. 1 is a flowchart of a constant air volume control method for a ventilation device according to an embodiment of the present application.

In order to solve the poor accuracy during the control of the constant air volume for the ventilation device, a constant air volume control method for a ventilation device is provided by an embodiment of the present application, as shown in FIG. 1, the constant air volume control method for a ventilation device is implemented as follows:

Step S101, acquiring a target air volume;

In accordance with an embodiment of the present application, the ventilation device may be an air conditioning device, or a device for ventilation, such as a range hood. During operation of the ventilation device, for example, during the operation of the air conditioning device, it may need to output an air volume according to the target air volume set by a user, so as to adjust the parameters including air humidity in an environment in which the air conditioning device is placed. Or, air containing oil fume is introduced out of the room where the range hood is placed, according to the target air volume set by the user, so as to improve the indoor air quality for the user.

The acquisition of the target air volume may be achieved by detecting a signal set via an air volume adjustment button for the ventilation device so as to acquire the signal triggered by the air volume adjustment button. According to the correspondence relation between preset trigger signals and target air volumes, the target air volume set by the user can be determined.

Or, the target air volume can also be determined by a wireless signal received by a wireless signal receiver module such as a Bluetooth module and an infrared module. For example, the air conditioning device can determine the target air volume thereof based on the received wireless signal sent by a remote controller.

Step S102, detecting a present rotational speed and a present torque of a motor of the ventilation device;

The present rotational speed of the motor of the ventilation device can be acquired by a rotational speed sensor. For example, a reflective line may be provided at a rotational portion of the motor, and when strong light is irradiated to the position of the reflective line of the motor, a light signal sensor provided at a corresponding position will receive the light reflected by the reflective line and produces a pulse signal. The number of the pulses is counted within a certain period, such that the rotational speed of the motor can be calculated. Based on similar principle, the present rotational speed of the motor of the ventilation device can be detected by means of magnetoelectric method, grating method, Hall switch detection method, etc.

The torque of the motor can be acquired as follows: detecting the present current flowing through a stator winding of the motor, and combining with the preset correspondence relation between currents and torques, the present torque corresponding to the present current is determined. Or, the rotational speed of the motor can be obtained by estimating.

Step S103, selecting an air volume calculation formula corresponding to the target air volume according to a preset correspondence relation between air volumes and air volume calculation formulas, and calculating a present air volume corresponding to the present rotational speed and the present torque;

In an embodiment of the present application, correspondence relation between different air volumes and air volume calculation formulas is preset, and the air volume calculation formula corresponding to the present air volume can be quickly and accurately searched out according to the target air volume.

In a possible implementation, the correspondence relation between air volumes and air volume calculation formulas can be the correspondence relation between air volume values and air volume calculation formulas, or can be the correspondence relation between air volume intervals and air volume calculation formulas. For example, the working air volume of the ventilation device may be divided into two or more air volume intervals according to one or more preset critical values.

In a possible implementation, the air volume calculation formula may be as follows:

$$Q_c = \sum_{k=0}^{j} \left( \sum_{m=0}^{i} \left( C_{km} \times n^{\left(\frac{k}{p}\right)} \times T^{\left(\frac{m}{q}\right)} \right) \right) \quad (1)$$

where $Q_c$ represents a calculated present air volume, n represents the rotational speed of the motor, T represents the torque of the motor of the ventilation device, m=0, 1, 2 . . . , i, k=0, 1, 2 . . . , j, both i and j are positive integers, p and q are certain positive integers, at least one of k/p or m/q is a decimal, $C_{km}$ represents a constant corresponding to different target air volumes. For the constant $C_{km}$, with the change of the parameters m and k, the air volume calculation formula may correspondingly have multiple corresponding constants $C_{km}$. For example, $C_{km}$ in the air volume calculation formula may include constants $C_0$, $C_1$, and $C_2$.

In the determination of the constant $C_{km}$ in the air volume calculation formula, original data of the ventilation device can be acquired in advance. The original data is acquired as follows: keeping the value of the air volume constant within a corresponding air volume interval, adjusting an external static pressure of the ventilation device, and measuring original data regarding the air volume of the ventilation device, the rotational speed of the motor, and the torque of the motor under the condition of different external static pressures. The air volume, the torque of the motor, and the rotational speed of the motor in the recorded original data are substituted into the air volume calculation formula, Or, the data in the original data is curve fitted, so as to obtain the values of the constant corresponding to the original data interval.

For example, Table 1 lists recorded original data. In Table 1, the recorded air volume range includes: 500 cubic feet per minute (cfm), 900 cfm, and 1500 cfm. By changing the external static pressure of the ventilation device, the relation between motor rotational speeds and motor torques under different air volumes can be obtained.

TABLE 1

| Output air volume (cfm) | External static pressure (Pa) | Rotational speed of motor (r/min) | Torque of motor (N · m) |
|---|---|---|---|
| 500 | 25 | 439 | 0.55 |
| 500 | 50 | 554 | 0.66 |
| 500 | 75 | 624 | 0.75 |
| 900 | 25 | 570 | 0.70 |
| 900 | 50 | 644 | 0.79 |
| 900 | 75 | 716 | 0.90 |
| 1500 | 25 | 854 | 3.08 |
| 1500 | 50 | 894 | 3.18 |
| 1500 | 75 | 924 | 3.34 |

For example, in condition that the output air volume is 500 cfm, when the external static pressure is 25 Pa, the corresponding motor rotational speed is 439 r/min, and the corresponding motor torque is 0.55 N·m; when the external static pressure is changed to 50 Pa, the motor rotational speed is 554 r/min, and the motor torque is 0.66 N·m; and when the external static pressure is changed to 75 Pa, the motor rotational speed is 624 r/min, and the motor torque is 0.75 N·m.

The data regarding the air volume, the motor rotational speed, and the motor torque in the original data as listed in Table 1 are fitted into a curve, or substituted into formula (1), so as to calculate corresponding value of constant $C_{km}$ when k and m take different values.

After the value of the constant in the air volume calculation formula is determined, the present air volume corresponding to the present rotational speed and the present torque of the ventilation device can be calculated according to the air volume calculation formula.

Figure 2:
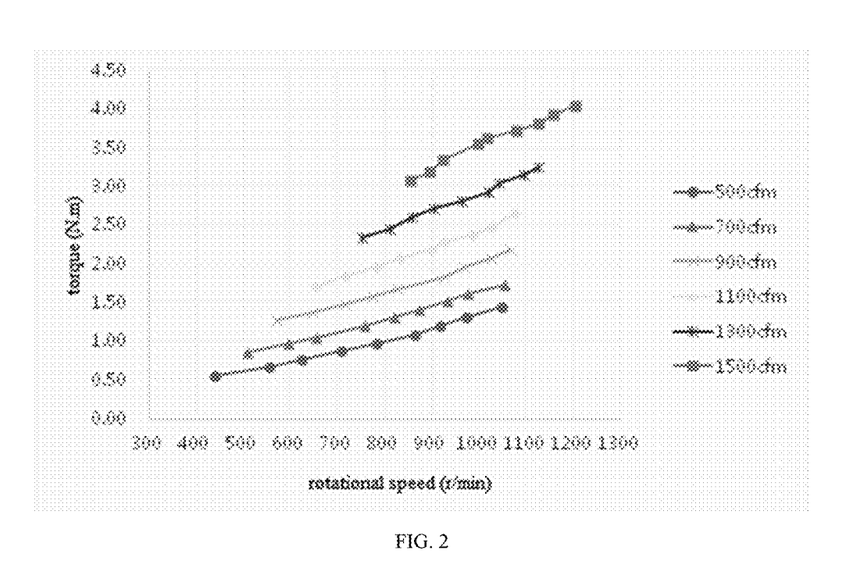
FIG. 2 is a curve diagram of original data provided by an embodiment of the present application.

Or, the recorded air volume in the original data includes: 500 cfm, 700 cfm, 900 cfm, 1100 cfm, 130 cfm, and 1500 cfm, the motor rotational speeds and the motor torques corresponding to different air volumes are recorded, thus obtaining the curve diagram of the original data of the ventilation device as shown in FIG. 2. In FIG. 2, for the same air volume, correspondence relation between the different motor speeds and motor torques under the same air volume can be obtained by changing the external static pressure, multiple coordinates representing corresponding motor speeds and motor torques under the same air volume are fitted, thereby obtaining a fitted curve.

In a possible implementation, the air volume calculation formula comprises:

$$Q_c = C_0 + C_1 \times n + C_2 \times n \times T + C_3 \times T^{1/2} + C_4 \times T^2 \quad (2)$$

where $Q_c$ represents the calculated present air volume, n represents the rotational speed of the motor, T represents the torque of the motor of the ventilation device, and $C_0, C_1, C_2, C_3$ and $C_4$ represent constants. Original data satisfying the correspondence relation between the air volume output by the motor, the motor speed, and the motor torque is curve fitted, or the original data of the output air volume, the motor speed, and the motor torque is substituted into formula (2), such that the values of constants $C_0, C_1, C_2, C_3$, and $C_4$ are calculated.

In an implementation for determining the constant of the air volume calculation formula (2), the air volume interval corresponding to the air volume calculation formula is preset as 500 cfm-1500 cfm. When the original data as listed in Table 1 is adopted, curves corresponding to the coordinates of the original data can be obtained by curve fitting. The air volume calculation formula can be determined according to the fitted curve:

$$Q_c = C_0 + C_1 \times n + C_2 \times n \times T + C_3 \times T^{1/2} + C_4 \times T^2$$

in which, values of the constants $C_0, C_1, C_2, C_3$, and $C_4$ are listed as follows:

TABLE 2

| $C_0$ | $C_1$ | $C_2$ | $C_3$ | $C_4$ |
|---|---|---|---|---|
| −40.782 | −1.203 | 0.098 | 1445.054 | −24.599 |

After the values of the constants in the air volume calculation formula are determined, the present air volume corresponding to the present rotational speed and the present torque can be calculated according to the air volume calculation formula with determined values of the constants.

In another implementation of an embodiment of the present application, the air volume interval for the air volume calculation formula includes: a small air volume interval of 500 cfm~900 cfm, and a large air volume interval of 900 cfm~1500 cfm. That is, a critical point 900 cfm is preset, and the working range of the air volume of the motor of the ventilation device is divided into the small air volume of 500 cfm~900 cfm, and a large air volume interval of 900 cfm~1500 cfm.

The present air volume calculation formulas include:

$$Q_1 = C_0 + C_1 \times n + C_2 \times n \times T + C_3 \times T^{1/2} + C_4 \times T^2 \quad (3)$$

$$Q_2 = C_5 + C_6 \times n + C_7 \times n \times T + C_8 \times T^{1/2} + C_9 \times T^2 \quad (4)$$

where $Q_1$ represents a present output air volume calculated within the small air volume interval, $Q_2$ represents a present output air volume calculated within the large air volume interval, n represents the rotational speed of the motor, and T represents the torque of the motor.

Original data related to the small air volume interval in the original data as listed in Table 1 is substituted into formula (3), and original data related to the big air volume interval in the original data as listed in Table 1 are substituted into formula (4), such that the calculation results of the constants $C_0, C_1, C_2, C_3, C_4, C_5, C_6, C_7, C_8$, and $C_9$ are as follows:

TABLE 3

| $C_0$ | $C_1$ | $C_2$ | $C_3$ | $C_4$ |
|---|---|---|---|---|
| −104.288 | −1.014 | −0.040 | 1434.864 | 15.787 |
| $C_5$ | $C_6$ | $C_7$ | $C_8$ | $C_9$ |
| −72.996 | −1.199 | 0.100 | 1467.459 | −26.432 |

After the values of the constants are calculated respectively, the air volume calculation formula corresponding to the small air volume interval and the large air volume interval can be determined.

After the target air volume is obtained, the target air volume is compared with the air volume interval, or compared with the critical point of the air volume, to determine the air volume interval in which the target air volume falls, and then the air volume calculation formula corresponding to the air volume interval is selected.

For example, when the target air volume is 700 cfm, because the target air volume 700 cfm is smaller than the critical point of the air volume, which means the target air volume falls within the small air volume interval, therefore, the air volume calculation formula corresponding to the small air volume interval is selected to calculate the present air volume.

For example, according to the values of the constants $C_0$, $C_1$, $C_2$, and $C_3$, the air volume calculation formula corresponding to the small air volume interval is as follows:

$$Q_1 = -104.288 - 1.014 \times n - 0.04 \times n \times T + 1434.864 \times T^{1/2} + 15.787 \times T^2$$

Therefore, the present air volume $Q_1$ can be calculated according to the present rotational speed n and the present torque T.

Also, in determination of the constants in the air volume calculation formula according to the original data, according to the variation of the error between the determined air volume calculation formula and the original data, the air volume interval corresponding to the air volume calculation formula is determined. For example, the error threshold can be preset, and when a difference between the calculated air volume according to the air volume calculation formula and the air volume of the original data is greater than the preset error threshold, an air volume critical point can be determined for division for the air volume intervals, such that a plurality of more accurate air volume intervals can be obtained, ensuring the calculation accuracy of the air volume calculation formula within the corresponding air volume interval.

Step S104, adjusting motor parameters of the ventilation device according to a difference between the present air volume and the target air volume.

According to the air volume interval where the target air volume is placed, the preset air volume calculation formula is searched out, and the present air volume corresponding to the present torque and the present rotational speed of the motor is calculated. The calculated present air volume is compared with the target air volume, and the motor parameters are adjusted according to the comparison results.

During the adjustment of the motor parameters according to the comparison results, the torque of the motor, as well as the rotational speed of the motor, can be adjusted.

In the adjustment of the rotational speed of the motor, a first target rotational speed can be calculated according to the target air volume, the present air volume, and the present rotational speed. A first air volume corresponding to the first target rotational speed and the present torque is calculated according to the calculated first target rotational speed and the air volume calculation formula corresponding to the target air volume. Thereafter, a second target rotational speed is calculated, according to the difference between the first air volume and the target air volume, and a second air volume is calculated according to the second target rotational speed and the present torque. Calculations are repeated likewise, until a calculated N-th air volume is consistent with the target air volume, which means that the difference between the N-th air volume and the target air volume fall within a preset error range.

In a possible implementation, the first target rotational speed can be calculated according to the formula $$n_{ref} = \frac{Q_{ref}}{Q_c} n,$$

where $Q_{ref}$ represents the target air volume, $Q_c$ represents the present air volume, n represents the present rotational speed, and $n_{ref}$ represents the first target rotational speed of the motor.

In the adjustment of the motor torque, the difference between the calculated present air volume and the received target air volume can be compared, and the target torque can be obtained by stepwise adjustment using proportional control or proportional-integral control according to the difference.

For example, the target air volume $Q_{ref}$ and the present output air volume $Q_c$ are compared, and the first target torque $T_{ref}$ can be generated according to a preset proportional control or proportional-integral control. The first air volume is then calculated based on the first target torque $T_{ref}$ and the present rotational speed. The difference between the first air volume and the target air volume is calculated, and the second target torque is further obtained. After that, the second air volume is calculated according to the second target torque and the present rotational speed, until the N-th air volume is consistent with the target air volume.

In an embodiment of the present application, the first air volume, the second air volume, and the N-th air volume can be understood as the air volume calculated in the first iteration, the air volume calculated in the second iteration, and the air volume calculated in the N-th iteration in the iterative calculation process.

Figure 3:
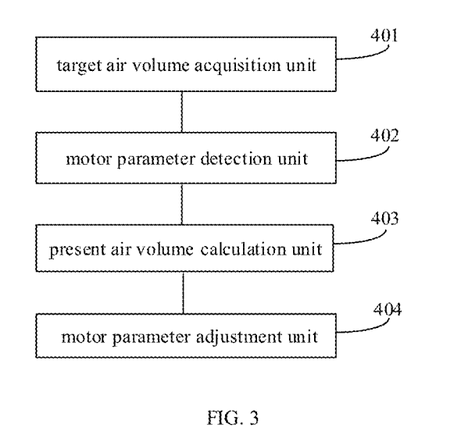
FIG. 3 is a structure diagram of a constant air volume control system for a ventilation device according to an embodiment of the present application.

FIG. 3 is a structure diagram of a constant air volume control system for a ventilation device provided by an embodiment of the present application. The constant air volume control system for a ventilation device comprises:
- a target air volume acquisition unit 401, configured for acquiring a target air volume;
- a motor parameter detection unit 402, configured for detecting a present rotational speed and a present torque of a motor of the ventilation device;
- a present air volume calculation unit 403, configured for selecting an air volume calculation formula corresponding to the target air volume according to a preset correspondence relation between air volumes and air volume calculation formulas, and calculating a present air volume corresponding to the present rotational speed and the present torque; and
- a motor parameter adjustment unit 404, configured for adjusting motor parameters of the ventilation device according to a difference between the present air volume and the target air volume.

The constant air volume control system for a ventilation device as shown in FIG. 3 corresponds to the constant air volume control method for a ventilation device as shown in FIG. 1.

Figure 4:
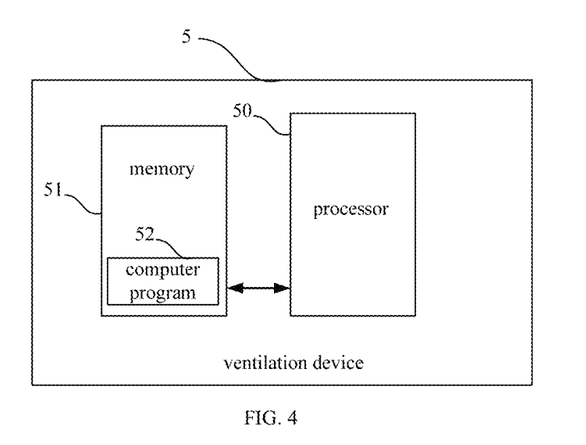
FIG. 4 is a diagram of a ventilation device provided by an embodiment of the present application.

FIG. 4 is a structure diagram of a ventilation device provided by an embodiment of the application. As shown in FIG. 4, the ventilation device 5 according to this embodiment includes: at least one processor 50 (only one is shown in FIG. 4), a memory 51, and a computer program 52 stored in the memory 51 and operable on the processor 50. The processor 50 is configured to implement any one of the steps in embodiments of the constant air volume control method of the ventilation device, when executing the computer program.

The ventilation device 5 may be a computing device such as a desktop computer, a notebook, a palmtop computer, and a cloud server. The ventilation device may include, but is not limited to, a processor 50 and a memory 51. Those skilled in the art can understand that FIG. 4 is only an example of the ventilation device 5, and does not constitute a limitation on the ventilation device 5. The ventilation device may include more or less components than those shown in the figure, or a combination of certain components, or different components. For example, the ventilation system can also include input and output devices, network access devices, etc.

The processor 50 may be a central processing unit (CPU), or the processor 50 may be another general-purpose processor, a digital signal processor (DSP), an application specific integrated circuit (ASIC), a field-programmable gate array (FPGA) or another programmable logic device, a discrete gate or a transistor logic device, a discrete hardware component, etc. The general-purpose processor may be a microprocessor or the processor may also be any regular processor or the like.

The memory 51 may be an internal storage unit of the ventilation device 5 in some embodiments, such as a hard disk or a memory of the ventilation device 5. In other embodiments, the memory 51 may be an external storage device of the ventilation device 5, such as a plug-in hard disk equipped in the ventilation device 5, a smart memory card (SMC), a secure digital (SD) card, a flash card, etc. Further, the memory 51 may include both an internal storage unit of the ventilation device 5 and an external storage device. The memory 51 is used to store an operating system, an application program, a boot loader, data, and other programs, such as the program code of the computer program. The memory 51 can also be used to temporarily store data that has been output or that is to be output.

Those skilled in the art can clearly understand that for the convenience and conciseness of the description, the division of the above functional units and modules is only used as an example. In actual applications, the above functions can be allocated to different functional units and modules, that is, the internal structure of the device can be divided into different functional units or modules, so as to realize all or parts of the above described functions. The functional units or modules in embodiments of the present application may also be integrated in one processing unit, or each unit exists alone physically, or two or more units are integrated into one unit. The above integrated unit may be implemented in the form of hardware as well as in the form of software. Moreover, specific names of the different functional units or modules are only for the purpose of facilitating the distinguishing therebetween, rather than limiting the protection scope of the present application. For specific working process of the units or modules in the above system, reference can be made to the processes corresponding to the above-described method embodiments, which would not be repeated hereinbelow.

An embodiment of the present application also provides a computer-readable storage medium. The computer-readable storage medium stores a computer program, and the computer program is configured to implement the steps in the above-described method embodiments when being executed by the processor.

An embodiment of the present application provides a computer program product. When the computer program product runs on a mobile terminal, the mobile terminal is able to implement the steps in the above-described method embodiments when executing the computer program product.

If the integrated unit is implemented in the form of a software functional unit and sold or used as an independent product, the integrated unit can be stored in a computer readable storage medium. Based on this understanding, the implementation of all or part of the processes in methods of the above-described embodiment of the present application can be accomplished by instructing relevant hardware through a computer program. The computer program can be stored in a computer-readable storage medium. When the computer program is executed by the processor, the steps of the foregoing method embodiments can be implemented. The computer program includes computer program code, and the computer program code may be in the form of source code, object code, executable file, or some intermediate forms. The computer-readable storage medium may at least include: any entity or device capable of carrying the computer program code to the photographing device/ventilation device, recording medium, computer memory, read-only memory (ROM), and random access memory (RAM), electric carrier signal, telecommunication signal, and software distribution medium. For example, U disk, mobile hard disk, floppy disk, or CD-ROM, etc. In some jurisdictions, according to legislation and patent practices, computer-readable media cannot be electrical carrier signals and telecommunication signals.

In the above-described embodiments, the description of each embodiment has its own focus. For parts that are not detailed or recorded in an embodiment, reference may be made to related descriptions of other embodiments.

Those skilled in the art may be aware that the units and algorithm steps of the examples described in combination with the embodiments disclosed herein can be implemented by electronic hardware or a combination of computer software and the electronic hardware. Whether these functions are executed by the hardware or the software depends on the specific application and design constraint conditions of the technical solution. Professionals and technicians can use different methods for each specific application to implement the described functions, but such implementation should not be considered as beyond the scope of the present application.

In the embodiments provided in the present application, it should be understood that the disclosed apparatus/network equipment and method may be implemented in other ways. For example, the device/network device embodiments described above are merely illustrative. For example, the division of the modules or units is only a logical function division, and there may be other divisions in actual implementation, such as multiple units. Or components can be combined or integrated into another system, or some features can be omitted or not implemented. In addition, the displayed or discussed mutual coupling or direct coupling or communication connection may be indirect coupling or communication connection through some interfaces, devices, or units, and may be in electrical, mechanical, or other forms.

The units described as separate components may be or may not be physically separated, and the components displayed as units may be or may not be physical units, that is, they may be located in one place, or they may be distributed on multiple network units. Some or all of the units may be selected according to actual needs to achieve the objectives of the solutions of the embodiments.

The above-described embodiments are only used to illustrate the technical solutions of the present application, not to limit them. Although the present application has been described in detail with reference to the foregoing embodiments, those skilled in the art should understand that the foregoing technical solutions recorded in the embodiments can be modified, or some of the technical features are equivalently replaced. These modifications or replacements do not make the essence of the corresponding technical solutions deviate from the spirit and scope of the technical solutions of the embodiments of the application, and should be included in within the scope of the present application.

What is claimed is:

1. A constant air volume control method implemented by a processor, comprising:
    acquiring a target air volume for a ventilation device including a motor,
    detecting a present rotational speed and a present torque of the motor of the ventilation device;
    determining one of a plurality of air volume intervals in which the target air volume falls, a plurality of air volume calculation formulas of the motor corresponding to the plurality of air volume intervals, respectively, and each of the plurality of air volume calculation formulas of the motor representing a mapping from an air volume to a rotational speed of the motor and a torque of the motor;
    selecting, for the motor, one of the plurality of air volume calculation formulas that corresponds to the determined one of the plurality of air volume intervals, and calculating, based on the selected one of the plurality of air volume calculation formulas, a present air volume corresponding to the present rotational speed and the present torque; and
    adjusting motor parameters of the motor of the ventilation device according to a difference between the present air volume and the target air volume.

2. The method of claim 1, wherein:
the plurality of air volume calculation formulas include $$Q_c = \sum_{k=0}^{j} \left( \sum_{m=0}^{i} \left( C_{km} \times n^{\left(\frac{k}{p}\right)} \times T^{\left(\frac{m}{q}\right)} \right) \right),$$

wherein:
    $Q_c$ represents a calculated present air volume,
    n represents a rotational speed of the motor,
    T represents a torque of the motor,
    m=0, 1, 2 . . . , i, k=0, 1, 2 . . . , j, both i and j being positive integers,
    p and q are certain positive integers,
    at least one of k/p or m/q is a decimal, and
    $C_{km}$ represents a constant corresponding to the target air volume.

3. The method of claim 2, wherein the constant is obtained by curve fitting of original data of a correspondence relation among the air volume, the rotational speed of the motor, and the torque of the motor acquired in advance.

4. The method of claim 1, wherein the plurality of air volume intervals are obtained by division according to one or more preset critical values.

5. The method of claim 1, wherein the plurality of air volume calculation formulas include:

$$Q_c = C_0 + C_1 \times n + C_2 \times n \times T + C_3 \times T^{1/2} + C_4 \times T^2$$

wherein $Q_c$ represents a calculated present air volume, n represents a rotational speed of the motor, T represents a torque of the motor, and $C_0$, $C_1$, $C_2$, $C_3$, and $C_4$ represent constants corresponding to the target air volume.

6. The method of claim 5, wherein at least one of $C_2$ and $C_4$ is a non-zero coefficient.

7. The method of claim 1, wherein adjusting the motor parameters of the ventilation device according to the difference between the present air volume and the target air volume includes:
    calculating a target rotational speed of the motor according to the target air volume, the present air volume, and the present rotational speed.

8. The method of claim 1, wherein adjusting the motor parameters of the ventilation device according to the difference between the present air volume and the target air volume includes:
    calculating a first target rotational speed of the motor according to the target air volume, the present air volume, and the present rotational speed; and
    performing a first calculation according to the first target rotational speed to obtain a first air volume and performing a second calculation according to the first air volume, the target air volume, and the first target rotational speed to obtain a second target rotational speed, and repeating the first calculation and the second calculation until a calculated N-th air volume corresponding to an N-th target rotational speed is consistent with the target air volume.

9. The method of claim 1, wherein adjusting the motor parameters of the ventilation device according to the difference between the present air volume and the target air volume includes:
    determining the difference between the target air volume and the present air volume by comparison; and
    performing proportional control or proportional integral control according to the difference, to obtain a target torque of the motor corresponding to the target air volume.

10. A non-transitory computer readable storage medium storing a computer program that, when being executed by the processor, cause the processor to perform the method according to claim 1.

11. The method of claim 1, wherein selecting the one of the plurality of air volume calculation formulas includes selecting, without using the present torque and a target torque corresponding to the target air volume, the one of the plurality of air volume calculation formulas.

12. A ventilation device comprising:
    a memory storing a computer program; and
    a processor configured to execute the computer program to:
        acquire a target air volume for the ventilation device including a motor;
        detect a present rotational speed and a present torque of the motor of the ventilation device;
        determine one of a plurality of air volume intervals in which the target air volume falls, a plurality of air volume calculation formulas of the motor corresponding to the plurality of air volume intervals, respectively, and each of the plurality of air volume calculation formulas of the motor representing a mapping from an air volume to a rotational speed of the motor and a torque of the motor;
        select, for the motor, one of the plurality of air volume calculation formulas that corresponds to the determined one of the plurality of air volume intervals, and calculating, based on the selected one of the plurality of air volume calculation formulas, a present air volume corresponding to the present rotational speed and the present torque; and adjust motor parameters of the motor of the ventilation device according to a difference between the present air volume and the target air volume.

13. The ventilation device of claim 12, wherein:
the plurality of air volume calculation formulas include $$Q_c = \sum_{k=0}^{j}\left(\sum_{m=0}^{i}\left(C_{km} \times n^{\left(\frac{k}{p}\right)} \times T^{\left(\frac{m}{q}\right)}\right)\right),$$

wherein:
$Q_c$ represents a calculated present air volume,
n represents a rotational speed of the motor,
T represents a torque of the motor,
m=0, 1, 2 . . . , i, k=0, 1, 2 . . . , j, both i and j being positive integers,
p and q are certain positive integers,
at least one of k/p or m/q is a decimal, and
$C_{km}$ represents a constant corresponding to the target air volume.

14. The ventilation device of claim 13, wherein the constant is obtained by curve fitting of original data of a correspondence relation among the air volume, the rotational speed of the motor, and the torque of the motor acquired in advance.

15. The ventilation device of claim 11, wherein the plurality of air volume intervals are obtained by division according to one or more preset critical values.

16. The ventilation device of claim 11, wherein the plurality of air volume calculation formulas include:

$$Q_c = C_0 + C_1 \times n + C_2 \times n \times T + C_3 \times T^{1/2} + C_4 \times T^2$$

wherein, $Q_c$ represents a calculated present air volume, n represents a rotational speed of the motor, T represents a torque of the motor, and $C_0$, $C_1$, $C_2$, $C_3$, and $C_4$ represent constants corresponding to the target air volume.

17. The ventilation device of claim 12, wherein the processor is further configured to execute the computer program to:
calculate a target rotational speed of the motor according to the target air volume, the present air volume, and the present rotational speed.

18. The ventilation device of claim 12, wherein the processor is further configured to execute the computer program to:
calculate a first target rotational speed of the motor according to the target air volume, the present air volume, and the present rotational speed; and
perform a first calculation according to the first target rotational speed to obtain a first air volume and perform a second calculation according to the first air volume, the target air volume, and the first target rotational speed to obtain a second target rotational speed, and repeat the first calculation and the second calculation until a calculated N-th air volume corresponding to an N-th target rotational speed is consistent with the target air volume.

19. The ventilation device of claim 12, wherein the processor is further configured to execute the computer program to:
determine the difference between the target air volume and the present air volume by comparison; and
performing proportional control or proportional integral control according to the difference, to obtain a target torque of the motor corresponding to the target air volume.

* * * * *